Oct. 27, 1953  J. C. DIONNE  2,657,355
APPARATUS FOR THE DETECTION OF FLAWS
Filed Feb. 8, 1949  3 Sheets-Sheet 1
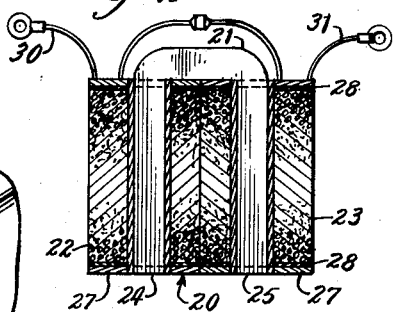
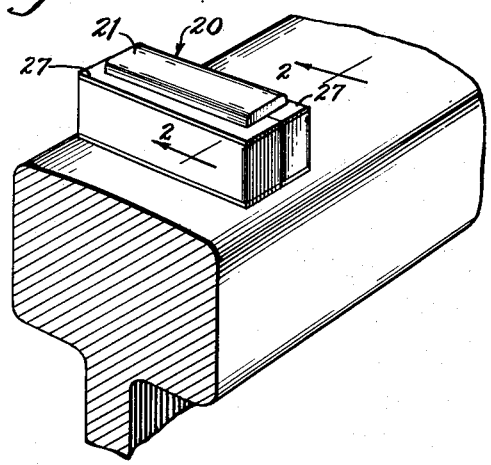
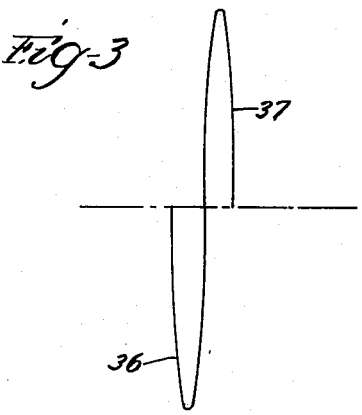
INVENTOR.
John C. Dionne
BY Mann and Brown
Attys.

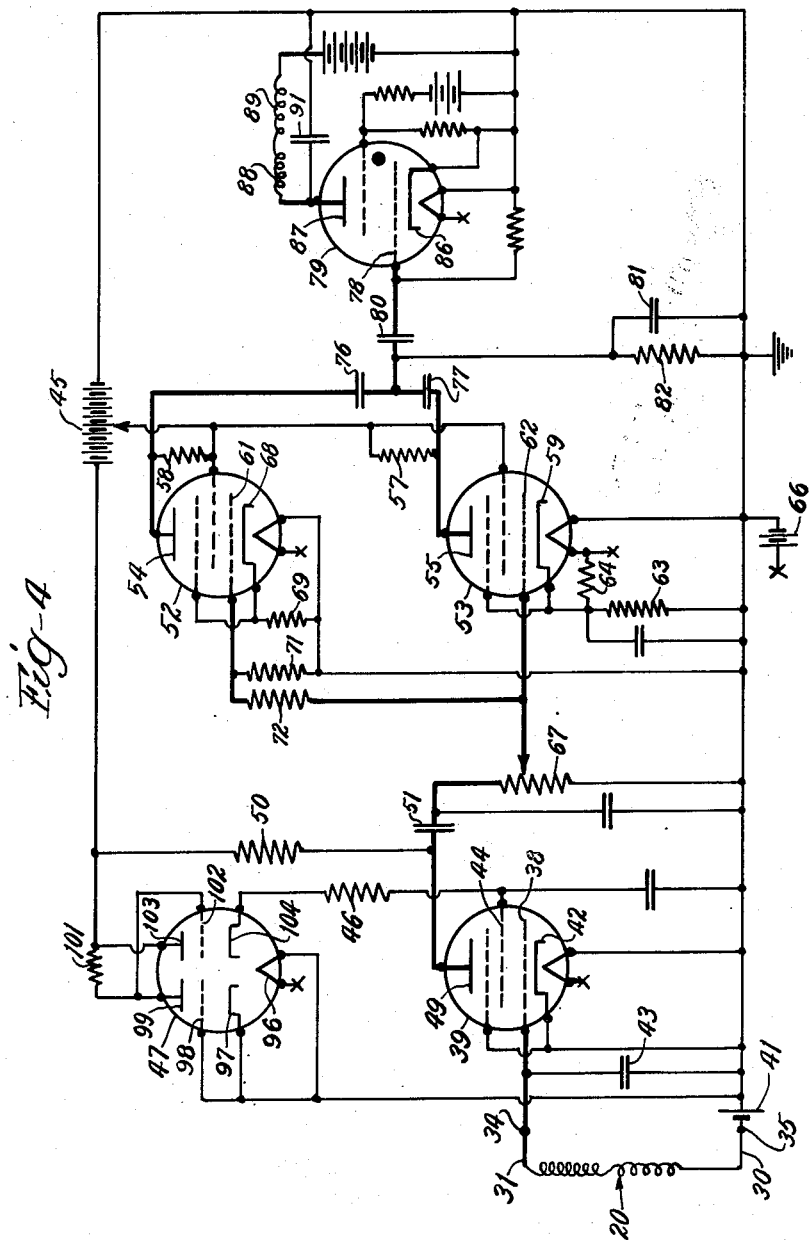

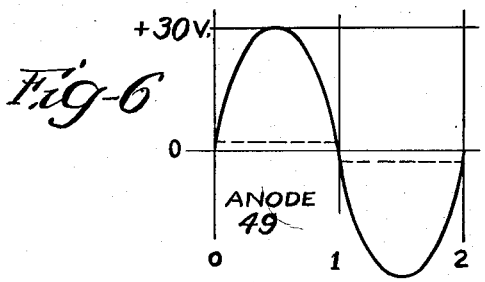
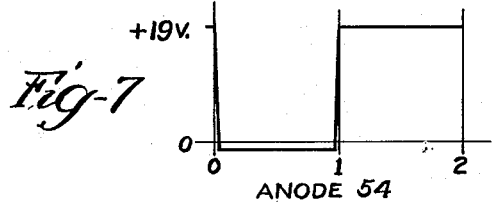
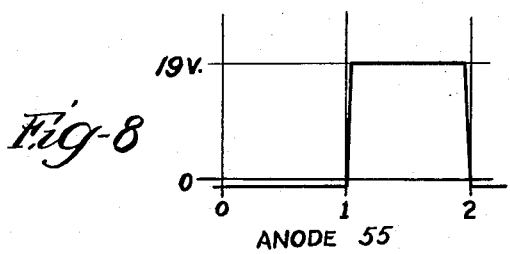
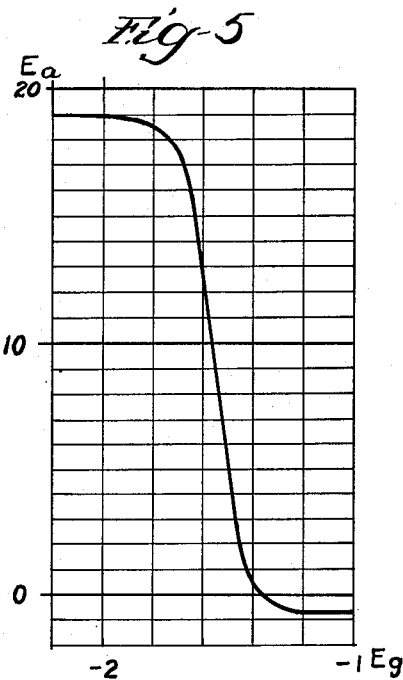
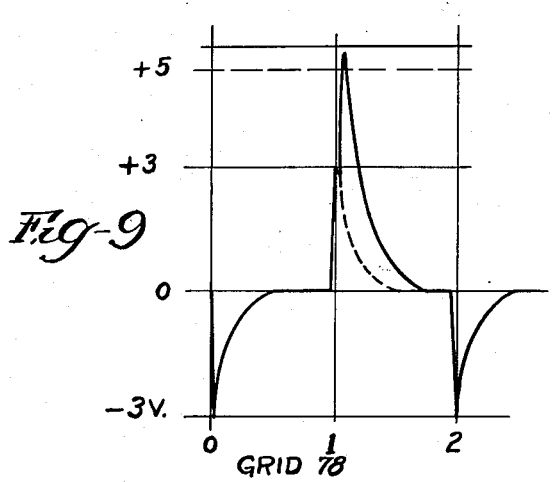
INVENTOR.
John C. Dionne

Patented Oct. 27, 1953

2,657,355

UNITED STATES PATENT OFFICE 2,657,355

APPARATUS FOR THE DETECTION OF FLAWS

John C. Dionne, Chicago, Ill.

Application February 8, 1949, Serial No. 75,210

7 Claims. (Cl. 324—37)

One of the principal problems encountered in the detection of flaws in rail through the use of an inductive pickup, an amplifier, and a recording mechanism, arises from the fact that many superficial defects in the rail will induce a voltage in the pickup and cause a record to be made. These superficial defects, such as burns, gags, etc., are not a source of imminent danger and there is no necessity of making a record of their presence. When they do appear on the record tape, the operator must ascertain, either through visual observation or by making a hand check of the particular spot on the rail from which the indication was received, whether or not the indication was made by a superficial defect or by a dangerous defect such as a transverse fissure.

From this it will be apparent that it is highly desirable to discriminate between the magnetic fields about a flaw and the magnetic fields about a superficial defect. The principal object of the present invention is to provide a method and apparatus for making such discrimination to prevent the record tape from being cluttered with unnecessary indications. Each unnecessary indication that can be eliminated from the tape reduces the time normally lost in determining whether or not a flaw or a superficial defect is present and, in addition, reduces the possibility that through an error in judgment on the part of the operator, a flaw will be overlooked, because of an erroneous conclusion deduced from visual observation that a record indication is due to a superficial defect when actually a flaw is present.

I have discovered that with a given magnetization of a metallic body such as a rail, as by passing a strong unidirectional flux through the rail and then removing the energizing flux, a fissure will produce a characteristic magnetic field having a particular polarity. A variation in size of the fissure does not cause any noticeable change in the characteristics of this field other than a change in the strength. On the other hand, by far the greatest majority of the superficial defects have considerably different types of magnetic fields.

When a wire which is arranged transversely of the longitudinal axis of the rail or other metallic body is moved longitudinally along said axis and through the characteristic magnetic field, a voltage wave is generated in the wire as it traverses the field. This voltage wave will be substantially sinusoidal, and with a given magnetization of the rail the phase of the transient wave generated as the wire passes through the field will always be the same. In other words, with a given magnetization, the voltage wave will always consist of a positive peak followed by a negative peak. If the magnetization is reversed, the polarity will be reversed.

With a given speed of travel of the wire with respect to the rail, the frequency and the period of the wave will be substantially constant for all fissures. However, the magnetic field about non-fissure defects will produce voltage waves of differing configurations and/or differing frequencies and periods.

By recording only those impulses which have a duopolarity wave of a particular phase and of a frequency substantially corresponding to that produced by fissure defects, the substantial majority of the non-fissure defects may be eliminated from the record tape and the testing procedure thereby greatly facilitated.

While a single wire, as previously explained, may be used as a pickup to produce a characteristic voltage wave as a basis for discrimination, the maximum voltage generated in a single wire is so minute that it is more desirable to use a pickup having a plurality of wires, thereby increasing the voltages transmitted to the amplifier. In my co-pending application, Serial No. 59,955, filed November 13, 1948, which has matured into Patent No. 2,602,108, there is disclosed and claimed certain types of pickups which are designed to produce better discrimination between flaws and superficial defects, in terms of output voltage waves. One of which pickups is illustrated in Figs. 1 and 2. The entire disclosure of said application is incorporated herein by reference to the extent that it is not inconsistent herewith.

Additional objects and advantages will become apparent from the following description taken in conjunction with the drawings, in which Fig. 1 is a perspective view of a pickup positioned over the upper surface of the rail head;

Fig. 2 is a section taken at line 2—2 of Fig. 1;

Fig. 3 is a duopolarity wave of the type produced by the pickup of Fig. 1 upon traversing the magnetic field about a flaw in the rail;

Fig. 4 is a schematic diagram of a preferred embodiment of the amplifier used in the invention;

Fig. 5 is a voltage curve illustrating the characteristics of the tube in one of the channels of the second stage of the amplifier of Fig. 4; and Figs. 6, 7, 8 and 9 are diagrams illustrating the form of a fissure wave at successive points in the amplifier.

Definitions

The waves which are dealt with in apparatus of this kind are what may be termed "transient waves"—that is, they occur intermittently or irregularly. The wave may be, but is not necessarily, a sinusoid (a sine wave). The term "duopolarity wave" has been used in the specification to include waves having both a positive and a negative pulse of somewhat symmetrical configuration, but which are not necessarily a sinusoid.

The period is the length of time required to complete one wave. When the wave is plotted as in Fig. 6, the length of the line along the horizontal axis from the beginning to the end of the wave represents the period. The frequency is the number of waves per unit of time. The period and the frequency are reciprocals of each other. In dealing with transient waves it is more convenient to speak of the period of the wave, but since they are interrelated, frequency may be used.

The term "phase" is used to indicate the point in the electrical variation to which the wave has advanced, considered in relation to a standard or to another wave. To illustrate: two waves both commencing at zero have identical curvatures and periods, differing only in that the initial pulse of one wave is positive and the initial pulse of the second wave is negative. The phase of one wave may be said to differ with the phase of the other wave by 180 degrees (a full wave length or period being represented by 360 degrees).

The term "fissure" is intended to include not only those cleavages which originate internally of the rail, but also those sometimes termed "detailed fractures" which may originate on the surface of the rail. These are differentiated from "non-fissure" defects such as burns, gags, corrugations, etc.

The term "electron valve" is used herein to include not only the well-known tubes having evacuated or gas filled chambers, but also other devices which will perform similar functions. For example, in place of the vacuum tube of three elements, i. e., a cathode, an anode, and a control grid, it may be possible to substitute a crystal of germanium or other material in which the current flow between a cathode and an anode may be changed by varying the potential on a control element in a manner similar to that in which the control grid of a vacuum tube changes the current flow between the cathode and anode of the latter device. Such crystals have been termed "transistors."

The pickups

The pickup, indicated generally by 20, illustrated in Figs. 1 and 2, is ideally suited to produce a characteristic electrical wave upon traversing the magnetic field about a magnetized fissure, which wave will differ principally in frequency, shape and/or phase from the voltage waves produced when the magnetic field about superficial defects is traversed. In addition, the pickup has a somewhat lower output voltage when traversing the magnetic field about a rail joint than was obtained with prior pickups. The general type of duopolarity wave produced by this pickup on traversing the magnetic field surrounding a magnetized fissure is illustrated in Fig. 3.

Pickup 20 is formed about an inverted U-shaped core 21 with coils 22 and 23 wound about legs 24 and 25, respectively, of core 21. I have found that a vertical coil in a pickup is most efficient, both in terms of producing a maximum output voltage upon traversing a fissure and in terms of discrimination between fissures and inconsequential defects, when the longitudinal spacing between the pole pieces 24 and 25 is substantially $\frac{2}{16}$ inch. The bobbins 27, upon which the coils are wound, are designed to maintain substantially this spacing. When two coils are used as in Figs. 1 and 2, each coil is somewhat under the $\frac{2}{16}$ inch spacing, and the two coils are spaced on approximately $\frac{2}{16}$ inch centers.

The windings of each of coils 22 and 23 consist of approximately 10,000 turns of No. 42 enameled wire and is wound about a brass bobbin 27; an insulating end plate 28 is placed at each end of the bobbin and the core of the bobbin is covered by several turns of an insulating cloth or paper (not shown) before the coils are wound. The total height of the bobbin from the bottom face to the top face is ¾ inch, but reasonable variations may be made in this length without critically affecting the operation of the pickup. The width of each of legs 24 and 25 of the core is ⅛ inch. The length of the pickup and core, as measured transversely to the longitudinal axis of the rail in Fig. 1, will depend upon the portion of the rail which is to be searched by the pickup. If a single pickup is to be used to cover the head of the rail as in Fig. 1, the total length of the bobbin 27 may be made about 2⅛ inches. If several pickups are to be used to separately search different portions of the rail head, proportionately smaller pickups will be used.

Coils 22 and 23 are connected in series opposition with leads 30 and 31 projecting from the coils to provide the connections to the amplifier. To determine whether or not the two coils are wired in opposition, leads 30 and 31 may be connected to a battery. If the proper wiring has been made, the pole ends of legs 24 and 25 of the core will be of opposite polarity; while if the wiring has been improperly made, the two poles will be of the same polarity.

The amplifier

Referring now to Fig. 4, the pickup 20 is connected to the amplifier by attaching leads 30 and 31 to input terminals 34 and 35 of the amplifier. If it subsequently proves that, for a given rail magnetization, the phase of fissure signal received from pickup 20 is the reverse of the phase of the signal which the amplifier will selectively reproduce, the connection of leads 30 and 31 on terminals 34 and 35 may be reversed to make the necessary correction. For the specific amplifier of Fig. 4, the initial pulse 36 of the fissure wave of Fig. 3 should be impressed on the control grid of the first tube as a negative voltage, while the second pulse 37 of the fissure wave should be impressed on that grid as a positive voltage.

Terminal 34 is connected to the control element or grid 38 of the first valve or tube 39 of the amplifier, while terminal 35 is connected to the negative side of a 1.5 volt battery 41. Battery 41 serves to bias control grid 38 slightly negative with respect to the cathode 42 which is at ground potential. A capacitor 43 between control grid 38 and ground tunes the pickup to the frequency of the desired fissure signals. With the pickup 20 traveling along the rail at six miles per hour, the frequency of the fissure wave is approximately 100 cycles per second. With a pickup 20 of the type described, a capacitor 43 of .05 microfarad will be found to be satisfactory.

Screen grid 44 of tube 39 is connected to a 180 volt battery 45 through a voltage dropping resistor 46 and stabilizing tube 47. Stabilizing tube 47 is to balance out the effects of heater voltage fluctuations on tube 39, as hereinafter described. The suppressor grid of tube 39 is connected to ground in the conventional manner.

The variations in current through anode 49 of tube 39 develop a varying voltage drop across anode load resistor 50, which variations are passed to the second stage through coupling capacitor 51. Tube 39 which is a 6AC7 has a maximum, undistorted gain factor of approximately 250. A medium-small fissure signal will produce a peak-to-peak anode voltage swing of approximately 60 volts. The general form of the wave on plate 49 is illustrated in Fig. 6.

The second stage of the amplifier includes two channels, an electron valve or tube 52 being in one channel and an electron valve or tube 53 being in the other channel. The anodes 54 and 55 of tubes 52 and 53, respectively, are supplied from a 22.5 volt tap on battery 45. The anode load resistor 57 of tube 53 is .47 megohm and the anode load resistor 58 of tube 52 is .39 megohm.

Fig. 5 illustrates the voltage characteristic curve of tube 53, the vertical scale being anode voltage and the horizontal scale being grid voltage. Both of these voltages are taken with respect to the cathode 59 which accounts for the fact that the anode voltage goes slightly below zero for a portion of the curve. From this curve it will be seen that when the grid voltage is approximately a minus 2 volts, the flow of current through anode load resistor 57 is substantially cut off, and if the grid is made further negative, substantially no change will occur in the anode current and the anode voltage will remain constant at about 19 volts. As the grid is made more positive from minus 2 volts, increasing amounts of current will begin to flow through load resistor 57, and the maximum current flow will be reached at approximately a minus 1.2 volts. At this point the voltage drop across load resistor 57 is so large that the anode 55 is actually negative with respect to cathode 59. As the grid voltage continues to become less negative, and even though it may become positive, substantially no further increase in anode current will occur, and the anode voltage will remain constant. The curve for tube 52 is substantially the same as the curve shown for tube 53.

The control element or grid 61 of tube 52 is biased at such a voltage that normally there is substantially no current passing from anode 54 through load resistor 58, and the anode voltage is 19 volts. Referring to the characteristic curve of Fig. 5, it will be seen that a biasing of approximately minus 2 volts will produce this result.

The control element or grid 62 of tube 53 is biased at approximately minus 1 volt, and with this biasing the current from anode 55 through load resistor 57 is at its maximum. The large current flow through resistor 57 produces an IR drop of such amount that the anode potential is slightly below zero volts.

Thus, tube 52 will only be responsive to positive impulses impressed on grid 61. Negative impulses on that grid will not be effective to cause any appreciable change in anode voltage. Tube 53, on the other hand, is only responsive to negative impulses on grid 62. Positive impulses on grid 62 will not cause an appreciable change in the potential of anode 55.

The potential of cathode 59 is determined by resistors 63 and 64, which form a voltage divider across heater battery 66. The normal cathode resistor 63 is 200 ohms and resistor 64 is 300 ohms. The potential of grid 62 is determined by the setting of the contact arm of one megohm poentiometer 67. Cathode 68 of tube 52 is biased to ground by a 390-ohm resistor 69. Grid 61 is biased by resistors 71 and 72 of 4.7 megohms and 2 megohms respectively.

The signal from the first stage passes through coupling capacitor 51 and the contact arm of potentiometer 67 to grid 62 of tube 53. The same signal is impressed on grid 61 of tube 52 through resistor 72. Potentiometer 67 is used in the manner of a volume control to determine the strength of the signal utilized in the operation of the two tubes of the second stage.

Since the peak voltage impulse on anode 49 is approximately 30 volts on a medium-small fissure and the voltage necessary to swing tubes 52 and 53 from minimum to maximum current transmission is less than one volt, the grid swing necessary to change from minimum to maximum anode current transmission (and vice versa) occurs very shortly after initial voltage change commences and the effect is to produce substantially square wave signals from tubes 52 and 53. This is illustrated in Figs. 6, 7 and 8. When the positive pulse from anode 49 commences, the potential on anode 54 is approximately 19 volts, and the potential on anode 55 is slightly under zero volts. As soon as that pulse increases the potential of grid 61 by several volts (depending upon the exact biasing of the grid), the current-flow through resistor 58 has reached a maximum value and the potential on anode 54 has dropped to slightly below zero volts. Tube 52 is maintained at maximum conduction until just before the end of the positive pulse, and as the positive impulse drops off to zero, the potential on anode 54 returns to 19 volts. Thus, it is only the portion of the positive impulse below the dotted line of Fig. 6 that determines the wave shape of the impulse on the plate of tube 52.

The positive impulse that produced a signal through tube 52 had no effect on the anode voltage of tube 53. However, the negative impulse from tube 39 immediately shuts off the flow of electrons through tube 53 with that flow remaining at a minimum for substantially all of the duration of the negative pulse. As illustrated in Fig. 8, the negative pulse causes the potential on anode 55 to change from slightly below zero to 19 volts, and finally back to slightly below zero volts. In this way the negative impulse from the first stage produces a square voltage pulse on anode 55 but has no effect on the potential of anode 54.

The signals from the anodes of tubes 52 and 53 are joined through coupling capacitors 76 and 77, each of which are .01 microfarad. The common side of capacitors 76 and 77 is coupled to control element or grid 78 of thyratron 79 through a .0005-microfarad capacitor 80 and to ground through a .0005-microfarad capacitor 81 and a 30 megohm resistor 82. As the potential of anode 54 drops from 19 to approximately zero volts, a signal is produced across capacitors 76, 80 and 81, which signal is immediately bled-off to ground through resistor 82, the result being a sharp, peaked, negative impulse on grid 78 of approximately 3 volts. As anode 54 returns to 19 volts, a similar positive signal of approximately 3 volts is produced on grid 78. However, before the signal has a chance to bleed-off appreciably, the potential of anode 55 also jumps from approximately zero to 19 volts and the combined impulse on grid 78 is close to 6 volts. The combined signal is then bled-off through resistor 82, producing a resultant positive impulse, as shown in solid lines of Fig. 9. When anode 55 returns from 19 to zero volts, a second negative pulse of approximately 3 volts is produced on grid 78.

Thyratron 79 is operated so as to require a positive signal of approximately 5 volts on grid 78 to initiate the discharge across the tube from cathode 86 to anode 87. The combined positive pulses from tubes 52 and 53 being slightly above the threshold of 5 volts is sufficient to fire the thyratron and cause the actuation of pen relay 88 and the paint gun control relay 89. The discharge across the thyratron is immediately quenched by capacitor 91 in the conventional manner.

Should a wave, similar to that in Fig. 6, except that it is reversed in phase with the negative pulse preceding the positive pulse, be delivered to the control grids of tubes 52 and 53, tube 53 would fire first because of the initial negative pulse, and the succeeding positive pulse would thereafter fire tube 52. The same two square pulses of Figs. 7 and 8 would be produced except that the square pulse of Fig. 8 would precede the square pulse of Fig. 7. The result would be that the combined center pulse of Fig. 9 would be of negative polarity although of approximately the same shape and magnitude, the reason being that the combined pulse would be caused by the anode 55 going from 19 volts to approximately zero, followed by anode 54 also going from 19 volts to approximately zero. Since the center double wave is negative, it could not cause a discharge of the thyratron no matter how large it might be. The two 3-volt waves of Fig. 9 would be of positive polarity on grid 78, but they would not reach the threshold of 5 volts, and the thyratron 79 would not discharge. It will be seen that the square wave from the second stage of the amplifier will only be effective to cause a current flow through the thyratron when the pulses occur in a specific sequence, and the amplifier is thereby rendered sensitive only to transient waves of a specific phase. The action of thyratron 79 is very similar to a relay, and in some practices of the invention it may be desirable to substitute a relay therefor.

Several factors are used to make the amplifier more sensitive to waves of one frequency than to those of another. As has previously been explained, capacitor 43 in parallel with pickup 20 serves to tune the pickup to waves of a given frequency and to attenuate waves of other frequencies. Further tuning is accomplished in the time decay of capacitors 76, 77, 80 and 81 and resistor 82. If the sides of the square pulse of Fig. 7 are sufficiently close together, the charge transmitted across capacitor 80 to grid 78 as a result of anode 54 going from 19 to zero volts may not be entirely neutralized by the current flow across resistor 82 at the time when anode 54 again returns to 19 volts from zero. In this instance, the positive pulse of Fig. 9 will be initiated from a point below zero and may not achieve a total positive potential sufficient to fire the thyratron.

If the period of the wave of Fig. 6 is relatively long and/or if the peak voltage of that wave is not adequately high, the two adjacent sides of the square pulses of Fig. 7 and that of Fig. 8 may not be sufficiently coincident to combine to produce a positive pulse of over 5 volts on grid 78 of the thyratron. Referring to the positive pulse of Fig. 9, if the 3-volt impulse from anode 54 has sufficient time to drain off through resistor 82 to less than 2 volts (which voltage change would take place along the dotted line of that figure), the addition of the 3-volt impulse produced by the potential change on anode 55 would not induce a total pulse of 5 volts on grid 78 and the thyratron would not fire.

The pickup and amplifier described will eliminate from the record tape a very high percentage of the non-fissure indications while faithfully locating the fissure. The pickup produces a duopolarity wave of a characteristic configuration, frequency, and phase upon traversing the magnetic field about the fissure. The amplifier then differentiates between such a wave and those having other characteristics to produce a record of only those magnetic fields corresponding to that of a fissure.

The wave cut-off action of the two channels of the second stage of the amplifier prevents the strong joint fields from paralyzing the amplifier even if such fields are of the same characteristics as those about a fissure. Since the joint signal will not paralyze the amplifier, it is possible to locate fissures within the angle bars and as close as a few inches from the end of the rail.

Since tube 39 in the first stage of the amplifier has an exceedingly high-gain factor, it is unduly sensitive to changes in the heater temperature. A relatively minor fluctuation in the voltage of heater battery 66 will cause a temperature change through a change in the flow of the current through the heater. As the heater temperature increases, a greater electron emission from cathode 42 will result, and a lowering of the temperature will reduce the cathode emission. These changes may proceed until the operation of the tube 39 reaches either the upper or lower end of the operating range of the tube characteristic curve and cause a distortion in the output signal. To eliminate the possibility of this occurring, a stabilizing tube 47 is used.

The heater 96 of the stabilizing tube is connected across the same battery 66 used for supplying current to the heater of tube 39. In this way, any voltage changes across the terminals of battery 66 will cause equal changes in temperature of the heater of tubes 39 and 47. Tube 47 consists of two triodes in a single envelope and is wired with the cathode 97 and control grid 98 of one of the triodes tied together to make that triode actually operate as a diode with the current flow across the diode being a function of the voltage of battery 66. An increase in the temperature of heater 96 will result in an increased flow of electrons from cathode 97 to anode 99. The increased current flow will cause a greater voltage drop across resistor 101, lowering the potential of grid 102 of the second triode.

Anode 103 of the second triode is connected to battery 45, and cathode 104 is connected to screen grid 44 of tube 39 through resistor 46. A lowering of the potential of grid 102 will reduce the flow of electrons from cathode 104 to anode 103, thus reducing the escape of electrons from screen grid 44. At all times there will be a certain number of electrons from cathode 42 of tube 39 impinging upon screen grid 44; and if the ability of these electrons to escape to battery 45 is reduced by decreasing the potential of grid 102 of tube 47, screen grid 44 will become less positive with respect to cathode 42. As screen grid 44 becomes less positive, the flow of electrons from cathode 42 to anode 49 will be impeded (or it might be said that there will be less assistance rendered to the flow of electrons from cathode 42 to plate 49). Thus, an increase in temperature of the heater 96 of tube 47 will offset the additional flow of electrons from cathode 42 caused by the increase in temperature of the heater of tube 39.

If the voltage of battery 66 should be reduced, the lowering of the temperature of the heater of tube 39 would tend to lessen the flow of electrons from cathode 42. At the same time, heater 96 would decrease the flow of electrons across the diode of tube 47, raising the potential of anode 99 and control grid 102, facilitating the flow of electrons from cathode 104 to anode 103 and raising the potential of screen grid 44. An increase in potential of screen grid 44 would serve to facilitate the flow of electrons from cathode 42 to anode 49, again offsetting the result of the lowered temperature of the heater of tube 39.

As an alternative method of connection, the heater of tube 39 and that of the stabilizing tube 47 might be wired in series (with sufficient battery voltage to handle the two tubes in series) rather than in parallel so that the same amount of current would always be flowing through the two heaters. In this way any change in current through the heater of tube 39, whether it was caused by a voltage change or for some other reason, would produce a similar temperature change in the heater of tube 47 to stabilize the operation of tube 39, as previously explained.

The choice of particular embodiments of the invention for specific illustration and description is merely a compliance with section 4888 of the revised statutes, and should not be construed as imposing unnecessary limitations on the appended claims. So also is the use of specific values for the components of the pickups and the amplifier.

I claim:

1. A device for the detection of the magnetic fields characteristic of magnetized flaws in an elongated body including a pickup adapted to be moved longitudinally of the body, said pickup comprising a core and coils wound about said core, said coils being connected in series opposition to produce a duopolarity wave of a predetermined phase upon traversing said field, and an amplifier connected to the pickup, said amplifier being responsive only to a duopolarity voltage wave of said phase and including a stage having a pair of parallel connected electronic tubes for simultaneous response to said duopolarity voltage wave, means biasing one of said tubes to cut off current flow therethrough, means biasing the other of said tubes for maximum current flow therethrough, and an indicating device coupled to said stage by means including a resistance capacitance network, thereby additively combining the outputs of said parallel connected tubes.

2. A device for the detection of the magnetic fields characteristic of magnetized flaws in an elongated body including a pickup adapted to be moved longitudinally of the body at a given speed, said pickup comprising a core and coils wound about said core, said coils being connected in series opposition to produce a duopolarity wave of a predetermined phase and frequency upon traversing said field, and an amplifier connected to the pickup, said amplifier being responsive only to a duopolarity voltage wave of said phase and frequency and including a stage having a pair of parallel connected electronic tubes for simultaneous response to said duopolarity voltage wave, means biasing one of said tubes to cut off current flow therethrough, means biasing the other of said tubes for maximum current flow therethrough, and an indicating device coupled to said stage by means including a resistance capacitance network, thereby additively combining the outputs of said parallel connected tubes.

3. A device for the detection of the magnetic fields characteristic of magnetized flaws in an elongated body including a pickup adapted to be moved longitudinally of the body at a given speed, said pickup comprising a core and coils wound about said core, said coils being connected in series opposition to produce a duopolarity wave of a predetermined phase and frequency upon traversing said field, fissure indicating means, and an amplifier having the input thereof connected to the pickup and the output connected to the indicating means, said amplifier being adapted to only actuate the indicating means in response to a pickup-produced voltage varying within a predetermined interval of time from a voltage of a predetermined polarity and minimum strength to a voltage of the opposite polarity and a predetermined minimum strength, said amplifier including a stage having a pair of parallel connected electronic tubes for simultaneous response to said duopolarity voltage wave, means biasing one of said tubes to cut off current flow therethrough, means biasing the other of said tubes for maximum current flow therethrough, and an indicating device coupled to said stage by means including a resistance capacitance network, thereby additively combining the outputs of said parallel connected tubes.

4. In a device for the detection of the magnetic fields characteristic of magnetized fissures in a rail, a pickup adapted to be moved longitudinally of the body, said pickup comprising a core and coils wound about said core, said coils being connected in series opposition to produce a duopolarity voltage wave, the initial portion of which is of a fixed polarity, upon traversing said field, and a cascade amplifier including one stage having two channels, an electronic tube in each of said channels, means biasing one of said tubes to cut off current flow therethrough and the other of said tubes to saturation current flow therethrough so that one of said channels is responsive to voltage waves of said polarity and the second of said channels is responsive to voltage waves of the opposite polarity, and means electrically connected to said stage and actuated only by impulses above a predetermined minimum voltage successively received from said one channel and said second channel respectively.

5. In a device for the detection of the magnetic fields characteristic of magnetized fissures in a rail, a pickup adapted to be moved longitudinally of the body at a given speed, said pickup comprising a core and coils wound about said core, said coils being connected in series opposition to produce a duopolarity voltage wave, the initial portion of which is of a fixed polarity, upon traversing said field, and a cascade amplifier including one stage having two channels, an electronic tube in each of said channels, means biasing one of said tubes to cut off current flow therethrough and the other of said tubes to saturation current flow therethrough so that one of said channels is responsive to voltage waves of said polarity and the second of said channels is responsive to voltage waves of the opposite polarity, and means electrically connected to said stage and actuated only by impulses above a predetermined minimum voltage successively received within a predetermined interval of time from said one channel and said second channel respectively.

6. In a device for the detection of the magnetic fields characteristic of magnetized fissures in a rail, a pickup adapted to be moved longitudinally of the body at a given speed, said pickup comprising a core and coils wound about said core, said coils being connected in series opposition to produce a substantially symmetrical, duopolarity voltage wave of a predetermined phase and period upon traversing said field, and a cascade amplifier including one stage having two channels, an electronic tube in each of said channels, means biasing one of said tubes to cut off current flow therethrough and the other of said tubes to saturation current flow therethrough so that one of said channels is adapted to square off the portion of the input wave of one polarity at a predetermined voltage and the other channel is adapted to square off the portion of the input wave of the opposite polarity at said predetermined voltage, a timing decay circuit electrically connected to said stage to produce signals of a given strength in response to changes of said predetermined voltage in the output wave of the second stage, the time required for said signals to decay from a given strength to substantially zero being less than one-half of the period of the wave, and means electrically connected to said circuit and responsive to a voltage of a predetermined polarity and greater than said given strength.

7. In a device for the detection of the magnetic fields characteristic of magnetized flaws in an elongated body, the combination of a pickup adapted to be moved along the body including a pair of coils formed about a vertical axis with an opening in the center of the coil, each coil being wound with the mean width between the coil windings, as measured parallel to the line of movement, being substantially 9/16 of an inch, said coils being spaced adjacent to each other along said line with the windings connected in series opposition, and an inverted U-shaped core with the two legs thereof within the openings in each of said coils respectively, and an amplifier connected to said pick-up, said amplifier including a pair of parallel connected electronic tubes for simultaneous response to said duopolarity voltage wave and being responsive only to a voltage wave having substantially a given period and varying from a voltage of a predetermined polarity to a voltage of the opposite polarity, means biasing one of said tubes to cut off current flow therethrough, and means biasing the other of said tubes for maximum current flow therethrough.

JOHN C. DIONNE.

References Cited in the file of this patent

UNITED STATES PATENTS

| Number | Name | Date |
| --- | --- | --- |
| 2,142,994 | Buckley | Jan. 10, 1939 |
| 2,204,089 | Landon | June 11, 1940 |
| 2,204,099 | Landon | June 11, 1940 |
| 2,223,371 | Keevil | Dec. 3, 1940 |
| 2,265,136 | Barnes et al. | Dec. 9, 1941 |
| 2,354,483 | Schock | July 25, 1944 |
| 2,404,099 | Schade | July 16, 1946 |
| 2,406,882 | Young | Sept. 3, 1946 |
| 2,461,252 | Barnes et al. | Feb. 8, 1949 |
| 2,480,418 | Paradise | Aug. 30, 1949 |